(12) United States Patent
Jander

(10) Patent No.: US 8,028,736 B2
(45) Date of Patent: Oct. 4, 2011

(54) SYSTEM FOR FORMING REINFORCEMENT LAYERS HAVING CROSS-DIRECTIONALLY ORIENTED FIBERS

(75) Inventor: Michael H. Jander, Eupen (BE)

(73) Assignee: OCV Intellectual Capital, LLC, Toledo, OH (US)

( * ) Notice: Subject to any disclaimer, the term of this patent is extended or adjusted under 35 U.S.C. 154(b) by 519 days.

(21) Appl. No.: 11/510,221

(22) Filed: Aug. 25, 2006

(65) Prior Publication Data

US 2008/0047657 A1 Feb. 28, 2008

(51) Int. Cl.
*D04H 5/08* (2006.01)
*D04H 3/10* (2006.01)
*B32B 5/12* (2006.01)

(52) U.S. Cl. .......... 156/439; 156/177; 428/113

(58) Field of Classification Search .......... 156/177, 156/425, 429, 439, 520; 442/366, 367; 428/112, 428/113
See application file for complete search history.

(56) References Cited

U.S. PATENT DOCUMENTS

| | | | |
|---|---|---|---|
| 2,215,150 A | 9/1940 | Hannen | |
| 2,882,673 A | 4/1959 | Buddecke | |
| 2,892,307 A | 6/1959 | Mangan | |
| 2,954,817 A | 10/1960 | Havemann | |
| 3,170,197 A | 2/1965 | Brenner | |
| 3,377,233 A | 4/1968 | Jackson | |
| 3,708,132 A * | 1/1973 | Lang | 242/444 |
| 3,719,540 A | 3/1973 | Hall | |
| 3,728,189 A | 4/1973 | Hannes | |
| 3,831,879 A | 8/1974 | Miller et al. | |
| 3,859,156 A * | 1/1975 | Yazawa et al. | 156/265 |
| 3,864,443 A | 2/1975 | Hopkins | |
| 3,892,307 A * | 7/1975 | Scholl | 198/851 |
| 3,953,185 A | 4/1976 | Aoki et al. | |
| 3,977,069 A | 8/1976 | Domaingue, Jr. | |
| 4,001,935 A | 1/1977 | Krohn et al. | |
| 4,018,964 A | 4/1977 | Otouma et al. | |
| 4,169,397 A | 10/1979 | Vehling et al. | |
| 4,178,670 A | 12/1979 | Schmid | |
| 4,352,769 A | 10/1982 | Meyer | |
| 4,417,937 A * | 11/1983 | Escher et al. | 156/169 |
| 4,519,281 A | 5/1985 | Spaller | |
| 4,630,515 A | 12/1986 | Spaller | |
| 4,750,960 A | 6/1988 | Bubeck | |
| 4,752,313 A | 6/1988 | Allaire et al. | |
| 4,780,432 A | 10/1988 | Minford et al. | |

(Continued)

FOREIGN PATENT DOCUMENTS

DE 1560007 7/1969

(Continued)

OTHER PUBLICATIONS

International Search Report dated Feb. 20, 2008 in PCT/US2007/018217.

(Continued)

*Primary Examiner* — Michael A Tolin
(74) *Attorney, Agent, or Firm* — Calfee, Halter & Griswold LLP

(57) ABSTRACT

A system for forming a cross-directional fiber reinforcement layer has a feeder for feeding an array of continuous fiber and a chopped fiber dispenser for distributing generally aligned, closely spaced chopped fibers onto the array of continuous fibers in a cross-directional manner.

25 Claims, 4 Drawing Sheets

U.S. PATENT DOCUMENTS

| | | | |
|---|---|---|---|
| 4,854,990 A | 8/1989 | David | |
| 4,921,518 A | 5/1990 | Allaire et al. | |
| 4,944,446 A | 7/1990 | Thompson | |
| 4,973,440 A | 11/1990 | Tamura et al. | |
| 5,020,403 A | 6/1991 | D'Angelo et al. | |
| 5,024,390 A | 6/1991 | Enderlin | |
| 5,078,934 A | 1/1992 | Yamamoto et al. | |
| 5,084,035 A | 1/1992 | Marttila | |
| 5,158,631 A | 10/1992 | Leoni et al. | |
| 5,192,390 A | 3/1993 | Perkins | |
| 5,202,071 A | 4/1993 | Nakamura et al. | |
| 5,204,033 A | 4/1993 | Pearce et al. | |
| 5,229,052 A | 7/1993 | Billiu | |
| 5,262,106 A | 11/1993 | Graham et al. | |
| 5,432,000 A | 7/1995 | Young, Sr. et al. | |
| 5,463,919 A | 11/1995 | Paybarah et al. | |
| 5,484,641 A | 1/1996 | Rotter | |
| 5,806,387 A | 9/1998 | Jander | |
| 5,819,614 A | 10/1998 | Jander | |
| 5,826,812 A | 10/1998 | Hand | |
| 6,029,897 A | 2/2000 | Jander | |
| 6,038,949 A | 3/2000 | Jander | |
| 6,096,164 A * | 8/2000 | Benson et al. | 156/425 |
| 6,182,332 B1 | 2/2001 | Jander | |
| 6,527,211 B1 | 3/2003 | Bellasalma | |
| 6,585,842 B1 * | 7/2003 | Bompard et al. | 156/166 |
| 6,630,226 B1 | 10/2003 | Legrand | |
| 6,949,289 B1 | 9/2005 | Lawton et al. | |
| 2002/0124936 A1 | 9/2002 | Loubinoux | |
| 2005/0008804 A1 | 1/2005 | Davies et al. | |
| 2006/0249256 A1 * | 11/2006 | Borgmann et al. | 156/425 |

FOREIGN PATENT DOCUMENTS

| | | |
|---|---|---|
| EP | 853058 | 7/1998 |
| EP | 1144288 | 10/2001 |
| FR | 2030408 | 11/1970 |
| FR | 2581631 | 11/1986 |
| GB | 1265123 | 3/1972 |
| GB | 2158471 | 11/1985 |
| JP | 54-31533 | 10/1979 |
| JP | 59-13423 | 1/1984 |
| JP | 7-068649 | 8/1994 |
| JP | 7-215587 | 8/1995 |
| JP | 7-107205 | 11/1995 |
| SU | 1694724 | 11/1991 |
| WO | 95/01939 | 1/1995 |
| WO | 96/32239 | 10/1996 |
| WO | 97/47448 | 12/1997 |
| WO | WO 00/15526 | 3/2000 |
| WO | WO 00/26457 | 5/2000 |
| WO | WO 03/038331 | 5/2003 |
| WO | 2008/027206 | 3/2008 |

OTHER PUBLICATIONS

Applicants submission to the European Patent Office, Applicants PCT/US07/18217 dated Jan. 28, 2010.
Office action from Eurasian Patent Application No. 200970225 dated Jun. 23, 2010.
Office action from European Patent Application No. 07836959.2 dated Jul. 20, 2009.
International Search Report from PCT/EP97/02961 dated Oct. 7, 1997.
International Search Report from PCT/US99/06545 dated Dec. 23, 1999.
Jander, "Industrial RTM: New developments in molding and pre-forming technologies", Owens Corning, 1991.
Ericson, et al., "Processing and Mechanical Properties of Oriented Preformed Glass Mat Reinforced Thermoplastics", Paper IV of Linkoping Studies in Science and Technology, (1993).
Office action from European Application No. 97925060.2 dated Jan. 11, 2000.
Office action from European Patent Application No. 07836959.2 dated Jul. 20, 2009.
Office action from Eurasian Patent Application No. 200970225 dated Jun. 23, 2010.
Office action from Mexican Application No. 01/02659 dated Jul. 8, 2004.
Office action from Japanese Application No. 2000-570072 dated Nov. 05, 2008.
Notice of Allowance from U.S. Appl. No. 09/152,980, dated Dec. 2, 1999.
Office action from Chinese Application No. 97195292.2 dated Jun. 8, 2001.
Office action from Mexican Application No. 98/10297 dated Aug. 4, 2003.
Office action from Canadian Application No. 2,254,992 dated Apr. 2, 2004.
Office action from U.S. Appl. No. 08/660,381, dated Apr. 15, 1997.
Office action from U.S. Appl. No. 08/660,381, dated Oct. 7, 1997.
Notice of Allowance from U.S. Appl. No. 08/660,381 dated Mar. 30, 1998.
Dissertations No. 278 entitled "Processing, Structure and Properties of Glass Mat Reinforced Thermoplastics", Division of Engineering Materials, Dept. of Mechanical Engineering, Linkoping University, Linkoping, Sweden, 1992.
Office action from Eurasian Application No. 200970225 dated Mar. 17, 2011.

\* cited by examiner

US 8,028,736 B2

SYSTEM FOR FORMING REINFORCEMENT LAYERS HAVING CROSS-DIRECTIONALLY ORIENTED FIBERS

TECHNICAL FIELD AND INDUSTRIAL APPLICABILITY

The present invention relates generally to a system for forming reinforcement layers having cross-directionally oriented fibers, and, particularly, to a system for the dispensing of both continuous fibers and chopped reinforcement fibers to form the reinforcement layers.

The present invention has industrial applicability for making fiber reinforced articles, mats or preforms that are suitable for reinforcing molded articles, such as structural composites, pipes and the like.

BACKGROUND OF THE INVENTION

Structural composites and other reinforced molded articles are commonly made using manufacturing processes such as resin transfer molding and structural resin injection molding. These molding processes have been made more efficient by using reinforcement fibers that are used to make a reinforcement layer or mat. The preformed fiber reinforced layers or mat "preforms" or filament winding prepregs have the approximate shape and size of the molded article.

As the technical requirements for reinforcement products increases, new methods for dispensing and laying down reinforcement fibers are required. One requirement is that the reinforcement fibers be delivered at faster speeds than used previously. Another requirement is that the reinforcement fibers be laid down in varying degrees of thickness or density to achieve the desired reinforcement result. Another requirement is that the reinforcement fibers be laid down in a predetermined orientation.

When preforms are made with specific amounts and specific orientations of the reinforcement fibers, the preforms provide improved strength to the molded product precisely at the weakest or most stressed locations. Because of this new design requirement, there often is a requirement that the fibers be dispensed in a very controlled manner.

Efforts to control the orientation of the fibers have not been entirely successful, especially at the high speeds necessary for commercially successful operations. When typical fiber dispensers are operated at a faster speed, the fibers cannot be successfully laid down in a pattern that is as controlled as is desired.

It is clear that improvements in dispensing precisely oriented fibers in a controlled manner, enabling a more precise distribution of fibers, would be desirable.

SUMMARY OF THE INVENTION

There has now been developed a system for rapidly and precisely dispensing chopped fibers in a cross-directional orientation onto an array of continuous fibers.

The system includes a feeder that supplies an array of continuous fibers in a first orientation. A chopped fiber dispenser distributes the chopped fibers onto the array of continuous fibers in a second, and cross-directional, orientation with respect to the first orientation of the array of continuous fibers.

In one aspect, the second orientation is defined as an angle $\theta$ between about 0° to about 90° with respect to the first orientation of the array of continuous fibers; where the angle $\theta$ is defined as an angle between x and z axes, where the x axis is defined by a top surface of the array of continuous fibers and the z axis is defined by a width of the array of continuous fibers.

There has also been developed a process for making a fibrous reinforcement layer which includes directing a supply of continuous fibers, and dispensing a supply of chopped fibrous material onto the continuous fibers. The continuous fibers are directed in a first orientation and the chopped fibrous materials are dispensed in a second, and cross-directional orientation, with respect to the first orientation of the continuous fibers.

Various objects and advantages of this invention will become apparent to those skilled in the art from the following detailed description of the preferred embodiment, when read in light of the accompanying drawings.

DETAILED DESCRIPTION AND PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. It is to be noted that like numbers found throughout the figures refer to like elements.

Figure 1:
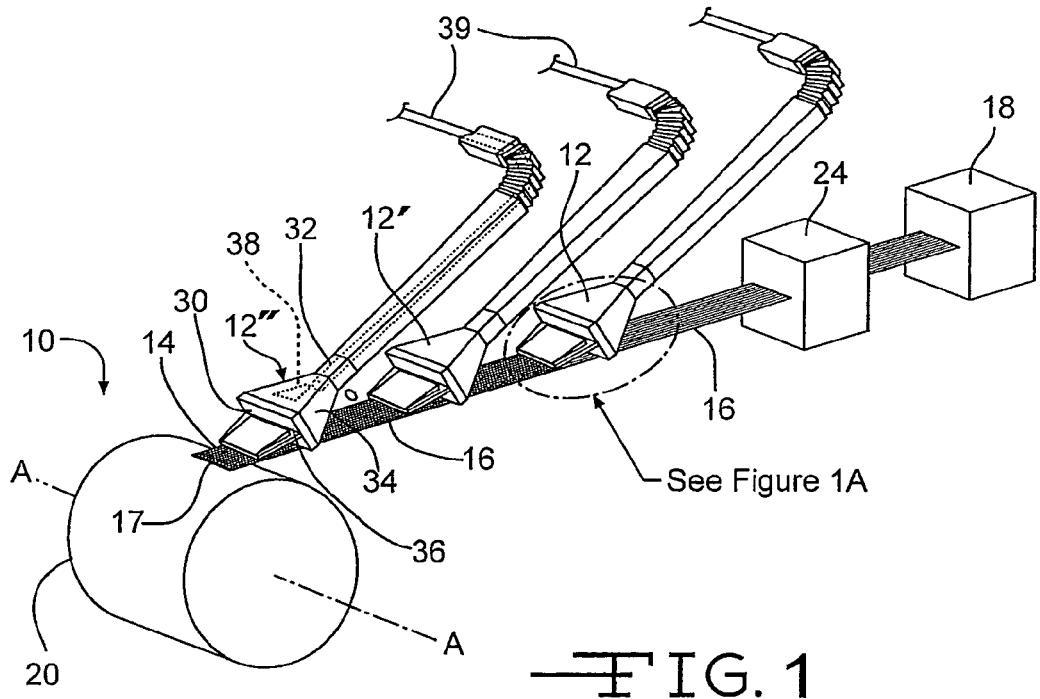
FIG. 1 is a schematic perspective illustration of one system for dispensing chopped fibers onto an array of continuous fibers so that the chopped fibers and continuous fibers are oriented in a cross-directional manner with respect to each other.

FIG. 1 shows a system 10 having a chopped fiber dispenser 12 for dispensing chopped fibers 14 onto an array of continuous fibers 16 in order to form a fibrous reinforcement layer 17. The chopped fiber dispenser 12 is positioned adjacent to the array of the continuous fibers 16. The chopped fiber dispenser 12 distributes the chopped fibers 14 onto the continuous fibers 16 in one or more desired cross-directional orientations with respect to the orientation of the continuous fibers 16.

In the embodiments shown in the FIGURES, the array of continuous fibers 16 is oriented in a longitudinal direction and the chopped fibers 14 are dispensed in a cross-direction orientation with respect to the longitudinal direction of the array of continuous fibers 16.

In certain embodiments, the chopped fibers 14 are dispensed from the fiber dispenser 12 in a generally aligned, closely spaced fashion such that the dispensed chopped fibers 14 are in substantially the same orientation. In certain embodiments, the chopped fibers 14 can be aligned in a substantially parallel fashion. Also, in certain embodiments, the chopped fibers 14 can have substantially the same lengths.

Figure 1A:
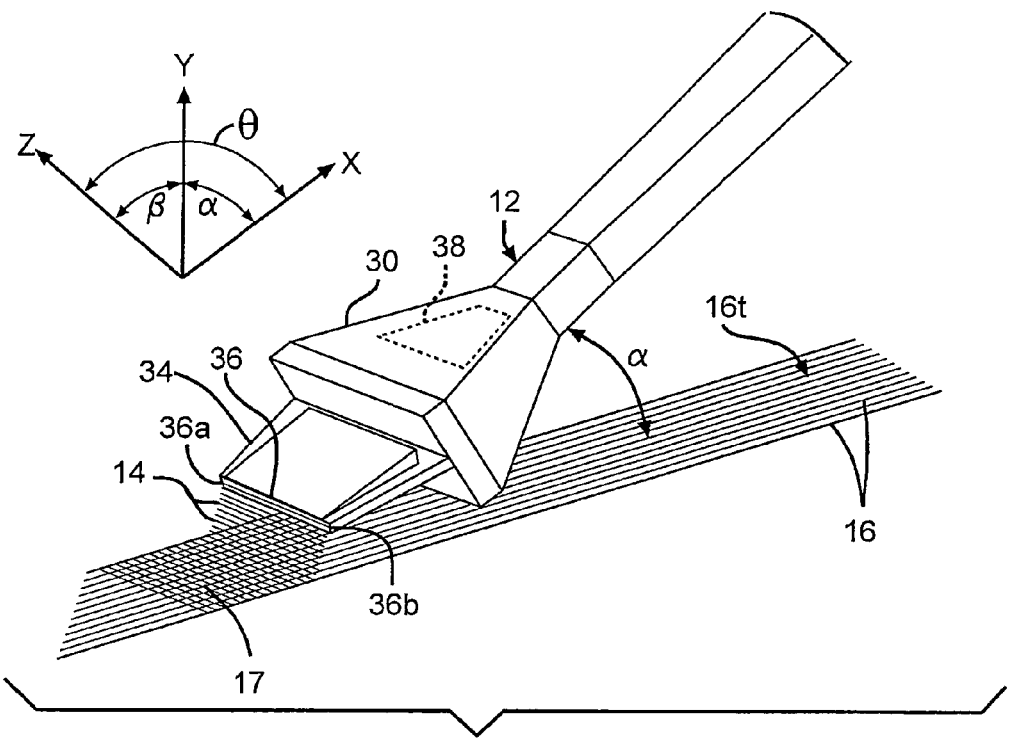
FIG. 1A is a schematic perspective illustration of one part of a system for dispensing chopped fibers onto an array of continuous fibers so that the chopped fibers and the array of continuous fibers are oriented in a cross-directional manner with respect to each other.
Figure 1B:
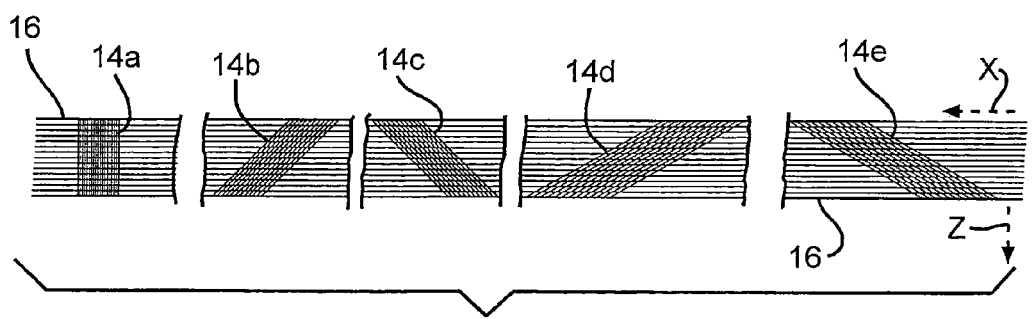
FIG. 1B is a top, or plan, view showing different cross-directional orientations of chopped fibers on the array of continuous fibers.

The system 10, in certain embodiments, as shown in FIG. 1, can include one or more additional dispensers 12' and 12" to provide a desired higher output and/or to achieve other orientations of chopped fibers, as schematically shown in FIG. 1B and further discussed below.

In certain embodiments, the chopped fiber dispenser 12 can be substantially as shown in U.S. Pat. No. 5,806,387, U.S. Pat. No. 5,819,614, U.S. Pat. No. 6,029,897, U.S. Pat. No. 6,038,949, and/or U.S. Pat. No. 6,182,332 issued to the inventor herein, Jander, and assigned to the same assignee herein, Owens Corning, which patents are expressly incorporated herein by reference.

The chopped fibers 14 can be glass fibers having a weight within the range of from about 300 to about 4800 g/km, and a diameter within the range of from about 8 to about 30 microns, although other weights and diameters can be used. For example, in a roving of 2400 g/km having fibers with a diameter of 17 microns, the chopped fiber output would range from about 0.1 to about 5 kg glass fibers per minute, with a total output (resin and glass) within the range of from about 0.2 to about 15 kg per minute.

The chopped reinforcement fibers 14 can be any material suitable for reinforcement purposes. One preferred material is Type 30® glass fibers, available from Owens-Corning Fiberglass Corporation, Toledo, Ohio, although other mineral fibers and organic fibers, such as polyester, Kevlar® and carbon fibers, can be used with the invention. It is to be understood that the chopped reinforcement fibers can be a single filament (monofilament) or a strand comprised of numerous filaments.

The continuous fibers 16 can be any material suitable for reinforcement purposes. One suitable material is Type 30® glass fibers, available from Owens-Corning, Toledo, Ohio, although other mineral fibers and organic fibers, such as polyester, aramid fibers such as Kevlar® type fibers, and carbon fibers, can be used. It is to be understood that the continuous fiber can be a single filament (monofilament) or a strand comprised of numerous filaments. In certain embodiments, the continuous fibers 16 comprise a glass fiber roving having from about 2200 to about 4800 tex, where a tex is defined as one gram per 1000 meters of filament. Usually the roving is formed by combining a plurality of strands, with each strand being about 25 to about 100 tex.

In operation, a supply of reinforcement fibers (not shown) is transported to the fiber dispenser 12 where the reinforcement fibers are chopped or cut to produce the chopped fibers 14.

In certain embodiments, the chopped fiber dispenser 12 has a nozzle 30 mounted at the end of an articulation arm 32. As shown in FIGS. 1 and 1A, the nozzle 30 has a nozzle chamber 34 with an outlet 36 for dispensing the chopped fibers 14. In certain embodiments, the nozzle chamber 34 has a tapered shape which helps to disperse the chopped fibers 14 exiting the nozzle 30 in a wider flow of chopped fibers 14 onto the continuous fibers 16.

It is to be understood that, in certain embodiments, the nozzle 30 contains a fluid directing device 38 (schematically shown in phantom in FIG. 1) that directs a fluid into the nozzle 30 to aid in spreading out, or flaring, a dispersed stream of the chopped fibers 14 in the nozzle 30. The dispersed stream of chopped fibers 14 can thus have any desired width.

The fluid can be delivered to the nozzle 30 by any suitable means such as a conduit 39. The fluid can be any material suitable for affecting the path of travel of the chopped fibers 14 in the nozzle 30. One suitable fluid is air, but other gases or even liquids can also be used. Some of the alternate fluids can be adapted to provide surface treatments or other fiber quality-affecting enhancements or bonding capability of the fibers to the resin material to be reinforced. In such embodiments, the temperature and moisture content of the fluid can be set to positively affect the fiber quality and properties.

The flow rate, the amount and/or the width of the dispersed stream of the chopped fibers 14 being dispensed from the nozzle 30 can be controlled by controlling the fluid entering the nozzle 30. By varying the introduction of fluid into the nozzle 30, the deposition of chopped fibers 14 on the continuous fibers 16 is precisely controlled, even while being deposited at a rapid rate.

A further level of control can be achieved by controlling the movement of the chopped fiber dispenser 12. FIG. 1A shows the chopped fiber dispenser 12 positioned at an angle $\alpha$ with respect to a top, or planar, surface 16$t$ of the array of continuous fibers 16. In the embodiment shown in FIG. 1A, the top surface 16$t$ is oriented along the x-axis and z-axis, where the x axis is defined by a longitudinally extending length of the continuous fibers 16. The chopped fibers 14 are dispersed at an angle $\alpha$, where the angle $\alpha$ is defined as the angle between the x and y axes, where the y axis is defined as being in a vertical perpendicular relationship to the x axis. The angle $\alpha$ at which the chopped fiber dispenser 12 is oriented can be varied between about 0° to about 90° to control the amount and the pattern of the chopped fibers 14 being dispensed onto the continuous fibers 16.

The chopped fiber dispenser 12 is also movable with respect to the continuous fibers 16. The chopped fiber dispenser 12 can include, for example, a hydraulic system (not shown) or other suitable system can be used to enable the chopped fiber dispenser 12 to be moved to a position adjacent or above any portion of the continuous fibers 16. The chopped fiber dispenser 12 can be moved to different positions so that the angle of the chopped fibers 14 being deposited on the continuous fibers 16 can be varied.

In certain embodiments, the angle $\alpha$ is varied by moving the chopped fiber dispenser 12 itself with respect to the top surface 16$t$ of the continuous fibers 16 and/or by adjusting the rate of flow of chopped fibers 14 from the chopped fiber dispenser 12.

The movement of the chopped fiber dispenser 12 with respect to the continuous fibers 16 can be controlled in any suitable manner. In certain embodiments, the chopped fiber dispenser 12 can be controlled by a computer (not shown) according to predetermined desired parameters so that one or more desired orientations of chopped fibers 14 are laid down on the continuous fibers 16.

Also, as shown in FIG. 1A, the nozzle outlet 36 of the chopped fiber dispenser 12 can be oriented along the z-axis by moving a first end 36$a$ of the nozzle outlet 36 at an angle $\theta$ with respect to a second end 36$b$ of the nozzle outlet 36, where angle $\theta$ is defined as the angle between the x and z axes. The angle $\theta$ can be varied between about 0° to about ±90°.

In certain embodiments, the nozzle outlet 36 can be also oriented along the z-axis by moving the nozzle outlet 36 at an angle $\beta$, where angle $\beta$ is defined as the angle between the y and z axes, where the z axis is defined as a width of the array of continuous fibers 16. In this manner, the nozzle outlet 36 sweeps across the width of the array of continuous fibers 16.

As an example, if a particular area of the continuous fibers 16 requires a higher/lower than normal concentration of chopped fibers 14, the rate of fiber deposition can be changed by adjusting (reducing/increasing) the fluid flow into the nozzle 30 during the time the nozzle 30 is directing the chopped fibers 14 to that particular area, thereby reducing/increasing the angle of flow ($\alpha$) and increasing/decreasing the concentration of the chopped fibers 14 on the specific area of the continuous fibers 16.

A further level of control can be achieved by coordinating the flow of fluid into the nozzle 30 with the movement of the chopped fiber dispenser 12. In another example, if a particular area of the continuous fibers 16 requires a higher/lower than normal concentration of chopped fibers 14, the rate, amount and/or orientation of the chopped fiber deposition can be changed by adjusting (reducing/increasing) one or more of: 1) the rate of fluid flow into the nozzle 30; 2) the amount of fluid flow into the nozzle 30; and/or, 3) the angles of $\alpha$, $\beta$, and/or $\theta$ of the chopped fibers 14 being dispersed.

This adjustment can be made during the time when the nozzle 30 is directing the chopped fibers 14 to that particular area, thereby reducing/increasing the angle of flow ($\alpha$) and increasing/decreasing the concentration of the chopped fibers 14 on the specific area of the continuous fibers 16.

FIG. 1B is a top plan schematic view of the top surface 16t of the continuous fibers 16 showing different orientations of chopped fibers 14. The chopped fibers 14 are oriented at an angle $\theta$ (as shown in FIG. 1A), where $\theta$ is defined as an angle between the x and z axes. The angle $\theta$ can range anywhere from 0° to ±90°. For example, in FIG. 1B, the chopped fibers 14a are oriented at a 90° angle $\theta$; the chopped fibers 14b are oriented at a +45° angle $\theta$; the chopped fibers 14c are oriented at a −45° angle $\theta$; the chopped fibers 14d are oriented at a +60° $\theta$; and, the chopped fibers 14e are oriented at a −60° angle $\theta$. It is to be understood that the deposition angle $\theta$ of the chopped fibers 14 can be varied, depending on the desired parameters for the fiber reinforcement layer 17.

The nozzle 30 need not have any particular dimensions, but in certain embodiments, the width from the first end 36a to the second end 36b of the nozzle 30 can be within the range of from about 15 to about 90 mm, and sometimes within the range of from about 25 to about 50 mm. The length of the nozzle 30 can be within the range of from about 40 to about 200 mm, and sometimes, within the range of from about 50 to about 90 mm. The flow angle $\beta$ (i.e., width of the dispensed chopped fibers) can be measured by determining the diameter or spray pattern width of the chopped fiber flow at a specific distance from the nozzle outlet 36. A typical ratio of distance-to-width is within the range of from about 5:1 to about 1:1, and preferably within the range of from about 5:1 to about 2:1.

In the schematic illustration shown in FIG. 1, the continuous fibers 16 are supplied from a suitable feeder 18. The feeder 18 can be any suitable device for supplying continuous fibers 16. In certain embodiments, the feeder 18 can comprise one or more packages of rovings. In other embodiments, the feeder 18 can be a fiber forming operation where the continuous fibers 16 are supplied from bushings and are directed into the system 10.

In certain embodiments, the continuous fibers 16 can be coated with a binder type material supplied by a suitable dispenser 24.

Also, in certain embodiments, the continuous fibers 16 are fed onto a collection surface 20 in a suitable manner. For ease of illustration herein, the collection surface 20 is shown as a rotating drum, but it should be understood that other collection surfaces can also be used with the system described herein. The collection surface can be, for example, a rotating drum, a mandrel for forming pipe, a conveyor, or a spool for a fabric material.

In embodiments where the collection surface 20 is a rotating drum, the continuous fibers 16 are longitudinally supplied along an outer surface of the drum 20. The rotating drum 20 can be mounted along an axis A-A for rotation by any suitable means, such as by motor (not shown). Also, in certain embodiments, the feeder 18 can be configured to move along the axis A-A of the collection surface 20 and to supply the continuous fibers 16 in a desired pattern on the collection surface 20. In certain embodiments, both the feeder 18 and the chopped fiber dispenser 12 can be configured to move axially along the axis A-A with respect to the collection surface 20.

Figure 2:
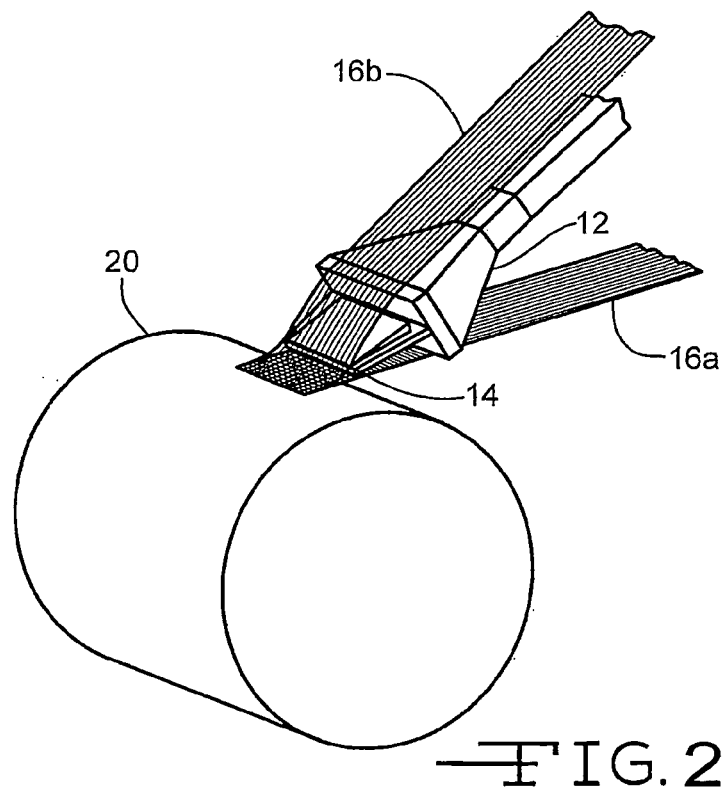
FIG. 2 is a schematic perspective illustration of another system for dispensing chopped fibers onto an array of continuous fibers so that the chopped fibers and the array of continuous fibers are oriented in a cross-directional manner with respect to each other, showing two layers of arrays of continuous fibers.

In another embodiment, as shown in FIG. 2, the chopped fibers 14 can be dispensed onto a first supply 16a of continuous fibers. A second supply 16b of continuous fibers is then supplied on top of the chopped fibers 14. The second supply 16b can be supplied at the same or a different orientation with respect to the orientation of the first supply 16a.

Figure 3:
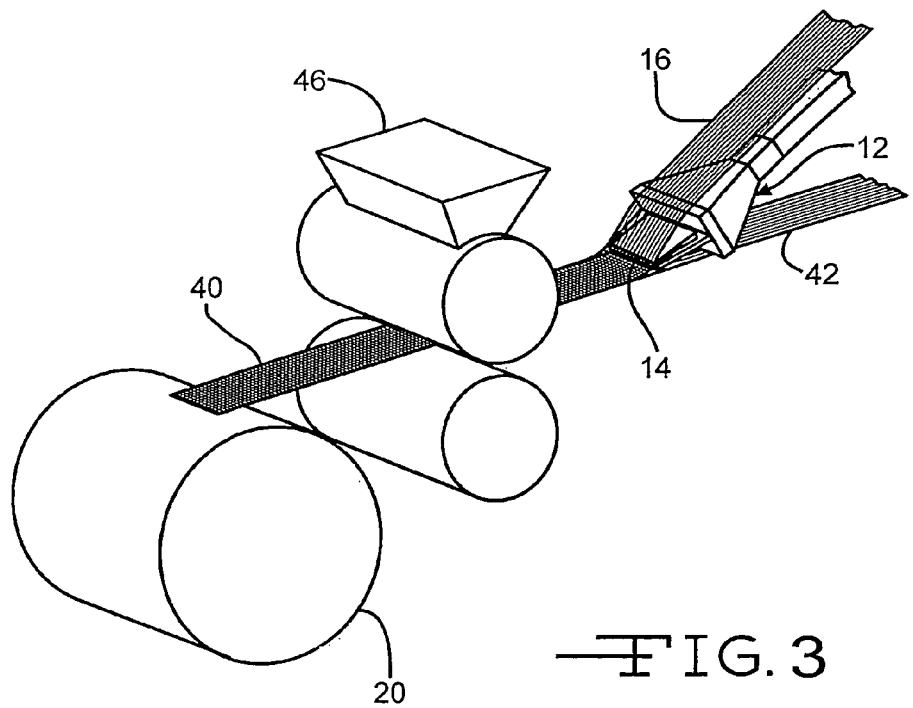
FIG. 3 is a schematic perspective illustration of another system for dispensing chopped fibers onto an array of continuous fibers so that the chopped fibers and the array of continuous fibers are oriented in a cross-directional manner with respect to each other, where a binder material is applied to the fibers.

FIG. 3 shows a system for making a preform 40. The chopped fibers 14 are dispensed onto a mat 42. The mat 42 can be comprised of any suitable combination, such as randomly dispersed materials, woven materials, and/or nonwoven materials. The continuous fibers 16 are deposited onto the chopped fibers 14 that are covering the mat 42 so that the perform 40 is formed. The preform 40 can be impregnated with a suitable impregnation material from any suitable dispenser 46.

Also, in certain embodiments, the chopped fibers 14 can be impregnated with a suitable material such as a binder or resin material before the chopped fibers 14 are dispensed onto the continuous fibers 16. In other embodiments, the continuous fibers 16 can be impregnated with a suitable material such as a binder or resin material before the continuous fibers 16 are dispensed onto the collection surface 20. In still other embodiments, both the chopped fibers 14 and the continuous fibers 16 can be impregnated with a suitable material. The impregnating material can be supplied in any suitable manner so that the fibers are substantially coated with the material. In certain embodiments, the material can be a thermoset resin, such as a polyester, epoxy, phenolic or polyurethane resin. In other embodiments, the material can be a thermoplastic such as block copolymer of caprolactam polymer and elastomer Nyrim® resin or other suitable materials.

Figure 4:
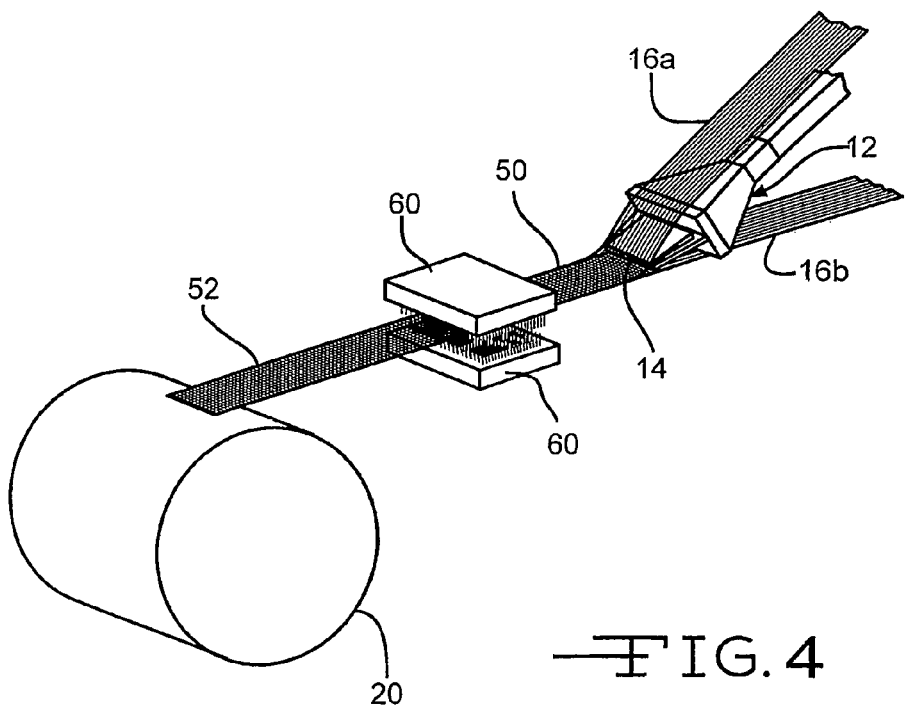
FIG. 4 is a schematic perspective illustration of one system for dispensing chopped fibers onto an array of continuous fibers so that the chopped fibers and the array of continuous fibers are oriented in a cross-directional manner with respect to each other, where the fibrous reinforcement layer is subjected to a needling process.

FIG. 4 shows a system where a first supply of continuous fibers 16b receives a supply of chopped fibers 14. A second supply of continuous fibers 16a is deposited on the chopped fibers 14 to form a multilayer reinforcement layer 50. Thereafter, the multi-layer reinforcement layer 50 can be formed into a fabric 52 by being subjected to a needling or stitching process, generally shown by the needling apparatus 60.

Figure 5:
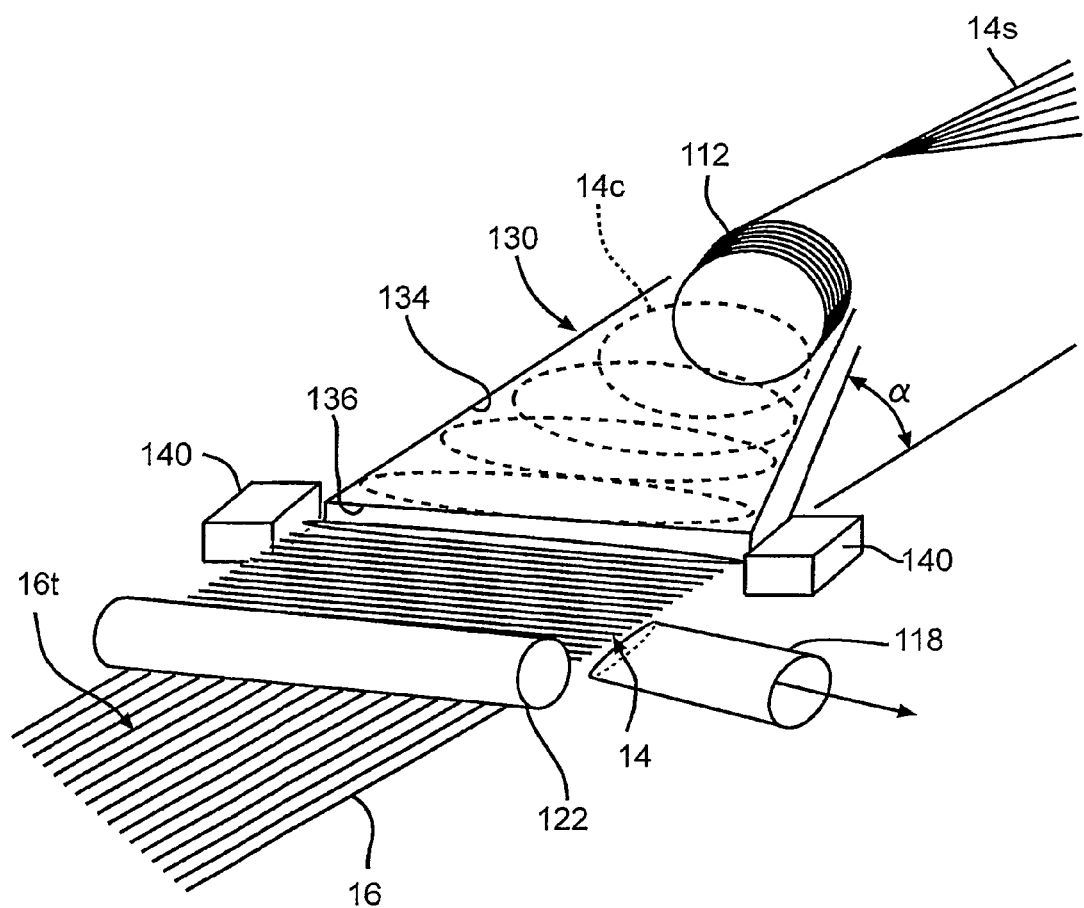
FIG. 5 is a schematic perspective illustration of another system for dispensing chopped fibers onto an array of continuous fibers so that the chopped fibers and the array of continuous fibers are oriented in a cross-directional manner with respect to each other.

FIG. 5 shows another system having a reinforcement dispenser 112 which is positioned to deposit chopped reinforcement fibers 14 onto an array of continuous fibers 16. The reinforcement dispenser 112 need not be robotized or automated, and could even be stationary with the array of continuous fibers 16 being moveable. In certain embodiments, a source 118 of vacuum can be positioned beneath the array of continuous fibers 16 to facilitate the deposition process. Also, in certain embodiments, a compaction device 122 can be used to debulk the chopped reinforcement fibers 14.

Reinforcement fibers 14s, supplied from a source not shown, are transported to a nozzle 130 in the fiber dispenser 112 where the reinforcement fibers 14s are chopped or cut to produce the discrete length reinforcement fibers 14.

In certain embodiments, the chopped fiber dispenser 112 has a nozzle 130 that has a nozzle chamber 134 with an outlet 136 for dispensing the chopped fibers 14. In certain embodiments, the nozzle chamber 134 has a tapered shape which helps to disperse the chopped fibers 14 exiting the nozzle 130 in a wider flow of chopped fibers 14 onto the continuous fibers 16. It is to be understood that, in certain embodiments, the dispersed stream of chopped fibers 14 can thus have any desired width.

The nozzle 130 need not have any particular dimensions, but in certain embodiments, the width of the nozzle 30 can be within the range of from about 15 to about 90 mm, and sometimes within the range of from about 25 to about 50 mm. The length of the nozzle 130 can be within the range of from about 40 to about 200 mm, and sometimes, within the range of from about 50 to about 90 mm. The flow angle $\beta$ (i.e., width of the dispensed chopped fibers) can be measured by determining the diameter or spray pattern width of the chopped fiber flow at a specific distance from the nozzle outlet 136. A typical ratio of distance-to-width is within the range of from about 5:1 to about 1:1, and preferably within the range of from about 5:1 to about 2:1.

In the embodiment shown in FIG. 5, the reinforcement fibers 14s are wound in the nozzle 130 into a series of generally parallel loops or coils 14c. The coils 14c are moved down stream axially of the nozzle 130. As the coils 14c are moved axially, they are engaged by a cutter 140 which makes one or more cuts in each loop or coil 14c. The cutter 140 can be of any type capable of severing the reinforcement fibers 14c into discrete lengths of chopped fibers 14. Examples of cutters include heating devices and lasers. As shown in FIG. 5, after the coils 14c are cut by the cutter 140, they travel downwardly as discrete lengths of chopped fibers 14. The discrete lengths of fibers are laid down in a generally parallel, closely spaced fashion on the array of continuous fibers 16.

As stated above, the flow rate, the amount and/or the width of the dispersed stream of the chopped fibers 14 being dispensed from the nozzle 130 can be controlled so that the deposition of chopped fibers 14 on the continuous fibers 16 is precisely controlled, even while being deposited at a rapid rate.

A further level of control can be achieved by controlling the movement of the chopped fiber dispenser 112. FIG. 5 shows the chopped fiber dispenser 112 positioned at an angle $\alpha$ with respect to the top, or planar, surface 16t of the array of continuous fibers 16. In the embodiment shown in FIG. 5, the top surface 16t is oriented along the x-axis and z-axis, where the x axis is defined by a longitudinally extending length of the continuous fibers 16. The chopped fibers 14 are dispersed at an angle $\alpha$, where the angle $\alpha$ is defined as the angle between the x and y axes, where the y axis is defined as being in a vertical perpendicular relationship to the x axis. The angle $\alpha$ at which the chopped fiber dispenser 112 is oriented can be varied between about 0° to about 90° to control the amount and the pattern of the chopped fibers 14 being dispensed onto the continuous fibers 16.

The chopped fiber dispenser 112 is also movable with respect to the continuous fibers 16. The chopped fiber dispenser 112 can be, for example, a hydraulic system (not shown) or other suitable system can be used to enable the chopped fiber dispenser 112 to be moved to a position adjacent or above any portion of the continuous fibers 16. The chopped fiber dispenser 112 can be moved to different positions so that the angle of the chopped fibers 14 being deposited on the continuous fibers 16 can be varied.

In certain embodiments, the angle $\alpha$ is varied by moving the chopped fiber dispenser 112 itself with respect to the top surface 16t of the continuous fibers 16 and/or by adjusting the rate of flow of chopped fibers 14 from the chopped fiber dispenser 112.

Also, as shown in FIG. 5, the nozzle outlet 136 of the chopped fiber dispenser 112 can be oriented along the z-axis by adjusting a first end of the nozzle outlet 136 at an angle $\theta$ with respect to a second end of the nozzle outlet 136, where angle $\theta$ is defined as the angle between the x and z axes. The angle $\theta$ can be varied between about 0° to about ±90°.

In certain embodiments, the nozzle outlet 136 can be also oriented along the z-axis by moving the nozzle outlet 136 at an angle $\beta$, where angle $\beta$ is defined as the angle between the y and z axes, where the z axis is defined as a width of the array of continuous fibers 16. In this manner, the nozzle outlet 136 sweeps across the width of the array of continuous fibers 16.

As an example, if a particular area of the continuous fibers 16 requires a higher/lower than normal concentration of chopped fibers 14, the rate of fiber deposition can be changed by adjusting (reducing/increasing) the flow of chopped fibers 14 from the nozzle 130 during the time the nozzle 130 is directing the chopped fibers 14 to that particular area, thereby reducing/increasing the angle of flow ($\alpha$) and increasing/decreasing the concentration of the chopped fibers 14 on the specific area of the array of continuous fibers 16.

A further level of control can be achieved by coordinating the flow of chopped fibers 14 from the chopped fiber dispenser 112. In another example, if a particular area of the continuous fibers 16 requires a higher/lower than normal concentration of chopped fibers 14, the rate, amount and/or orientation of the chopped fiber deposition can be changed by adjusting (reducing/increasing) one or more of: 1) the rate of chopped fiber flow from the nozzle 130; and/or 2) the angles of $\alpha$, $\beta$, and/or $\theta$ of the chopped fibers 14 being dispersed.

While the invention has been described with reference to a preferred embodiment, it should be understood by those skilled in the art that various changes may be made and equivalents may be substituted for elements thereof without departing from the essential scope of the invention. In addition, many modifications may be made to adapt a particular situation or panel to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A system for forming a fibrous reinforcement layer having at least one chopped fiber layer of cross-directionally oriented fibers formed on an array of continuous fibers in a first orientation, the system comprising:
   a feeder for feeding said array of continuous fibers in said first orientation; and,
   a chopped fiber dispenser including a nozzle to dispense generally aligned, closely spaced chopped fibers onto the array of continuous fibers in respective multiple second controlled orientations with respect to the first orientation of the array of continuous fibers, said chopped fiber dispenser being selectively movable relative to said array of continuous fibers to vary a positional relationship of said chopped fibers placed on said array of continuous fibers,
   wherein the nozzle includes a fluid directing device for directing a fluid into the nozzle.

2. The system of claim 1, wherein said chopped fiber dispenser is movable with respect to a transverse direction relative to said array of continuous fibers which moves along a longitudinal direction so as to vary the pattern of the placement of said chopped fibers on said array of continuous fibers.

3. The system of claim 1, wherein the chopped fiber dispenser is oriented at an angle $\alpha$ from said array of continuous fibers, said chopped fiber dispenser being movable to vary said angle $\alpha$ so as to control the rate and pattern of the placement of said chopped fibers on said array of continuous fibers,
   wherein said angle $\alpha$ is defined as an angle between x and y axes, and wherein said x axis is defined by a length of said array of continuous fibers and said y axis is defined as being in a vertical perpendicular relationship to said x axis.

4. The system of claim 1, wherein the chopped fiber dispenser has a nozzle including a nozzle outlet from which said chopped fibers are discharged onto said array of continuous fibers, said chopped fiber dispenser being movable such that one transverse end of said nozzle outlet is spaced further from said array of continuous fibers than an opposing transverse end of said nozzle outlet.

5. The system of claim 1, wherein the feeder is configured to feed at least a second supply of continuous fibers onto the chopped fibers.

6. The system of claim 1, further including a collection surface configured to receive the fiber reinforcement layer.

7. The system of claim 6, wherein the collection surface is at least one of a rotating drum, a mandrel for forming pipe, or spool for a fabric material.

8. The system of claim 4, wherein said nozzle is configured to dispense said chopped fibers transversely from said outlet.

9. The system of claim 8, wherein the nozzle is configured to control the concentration of chopped fibers dispensed from the nozzle.

10. The system of claim 8, further including a binder dispenser upstream of said chopped fiber dispenser.

11. The system of claim 8, further including a compaction device configured to debulk said chopped fibers.

12. The system of claim 6, wherein the collection surface comprises a conveyor.

13. The system of claim 1, wherein one or both of an amount and an orientation of said chopped fibers is varied in-line as said chopped fibers are dispensed from said chopped fiber dispenser.

14. The system of claim 13, wherein said one or both of said amount and said orientation of said chopped fibers is varied by a member selected from a rate of fluid flow into said chopped fiber dispenser and an increase in an angle $\alpha$,
wherein said angle $\alpha$ is defined as an angle between x and y axes, and
wherein said x axis is defined by a length of said array of continuous fibers and said y axis is defined as being in a vertical perpendicular relationship to the x axis.

15. A system for dispensing chopped fibers in a cross-directional orientation onto an array of continuous fibers comprising:
a feeder to provide said array of continuous fibers in a first orientation; and
a chopped fiber dispenser having a nozzle from which said chopped fibers are distributed in a second orientation onto said array of continuous fibers, said chopped fiber dispenser nozzle being selectively positionable relative to said array of continuous fibers to vary selectively an angular relationship of said second orientation relative to said first orientation of said array of continuous fibers,
wherein said chopped fibers are placed on said array of continuous fibers in a closely spaced, parallel configuration, and
wherein the nozzle includes a fluid directing device for directing a fluid into the nozzle.

16. The system of claim 15, wherein said chopped fiber dispenser is oriented at an angle $\alpha$ from said array of continuous fibers, said chopped fiber dispenser being movable to vary said angle $\alpha$ so as to control the rate and pattern of the placement of said chopped fibers on said array of continuous fibers,
wherein said angle $\alpha$ is defined as an angle between x and y axes, and
wherein said x axis is defined by a length of said array of continuous fibers and said y axis is defined as being in a vertical perpendicular relationship to said x axis.

17. The system of claim 15, wherein said chopped fiber dispenser has a nozzle outlet from which said chopped fibers are discharged onto said array of continuous fibers, said chopped fiber dispenser being movable such that one transverse end of said nozzle outlet is spaced further from said array of continuous fibers than an opposing transverse end of said nozzle outlet.

18. The system of claim 15, wherein said chopped fiber dispenser is movable transversely relative to said array of continuous fibers which moves along a longitudinal direction so as to vary the pattern of the placement of said chopped fibers on said array of continuous fibers.

19. The system of claim 17, wherein said chopped fiber dispenser is oriented at an angle $\alpha$ from said array of continuous fibers, said chopped fiber dispenser being movable to vary said angle $\alpha$ so as to control the rate and pattern of the placement of said chopped fibers on said array of continuous fibers,
wherein said angle $\alpha$ is defined as an angle between x and y axes, and
wherein said x axis is defined by a length of said array of continuous fibers and said y axis is defined as being in a vertical perpendicular relationship to said x axis.

20. The system of claim 19, wherein multiple chopped fiber dispensers are provided with each respective chopped fiber dispenser placing a layer of said chopped fibers onto said array of continuous fibers.

21. The system of claim 20, wherein said second orientation of said chopped fibers placed onto said array of continuous fibers by each respective said chopped fiber dispenser is different from said second orientation of said chopped fibers placed by each other chopped fiber dispenser.

22. The system of claim 20, wherein said feeder is configured to provide at least a second array of continuous fibers on said layer of chopped fibers.

23. The system of claim 22, wherein said arrays of continuous fibers and said layers of chopped fibers alternate.

24. The system of claim 15, wherein one or both of an amount and an orientation of said chopped fibers is varied in-line as said chopped fibers are dispensed from said chopped fiber dispenser.

25. The system of claim 24, wherein said one or both of said amount and said orientation of said chopped fibers is varied by a member selected from a rate of fluid flow into said chopped fiber dispenser and an increase in an angle $\alpha$,
wherein said angle $\alpha$ is defined as an angle between x and y axes, and
wherein said x axis is defined by a length of said array of continuous fibers and said y axis is defined as being in a vertical perpendicular relationship to the x axis.

* * * * *